(12) United States Patent
Holladay et al.

(10) Patent No.: US 10,778,509 B2
(45) Date of Patent: Sep. 15, 2020

(54) AUTOMATED SYSTEM SETUP (71) Applicant: Harman International Industries, Incorporated, Stamford, CT (US)

(72) Inventors: Adam Holladay, Salt Lake City, UT (US); Paul Chavez, Chatsworth, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 71 days.

(21) Appl. No.: 15/775,343

(22) PCT Filed: Nov. 24, 2015

(86) PCT No.: PCT/US2015/062335
§ 371 (c)(1),
(2) Date: May 10, 2018

(87) PCT Pub. No.: WO2017/091207
PCT Pub. Date: Jun. 1, 2017

(65) Prior Publication Data
US 2018/0351796 A1 Dec. 6, 2018

(51) Int. Cl.
*H04L 12/24* (2006.01)
*H04N 21/436* (2011.01)
*H04L 12/28* (2006.01)

(52) U.S. Cl.
CPC ...... *H04L 41/0803* (2013.01); *H04L 12/2803* (2013.01); *H04L 12/2805* (2013.01); *H04N 21/43615* (2013.01)

(58) Field of Classification Search
CPC .............................................. H04N 21/43615
See application file for complete search history.

(56) References Cited

U.S. PATENT DOCUMENTS 6,950,772 B1 * 9/2005 Callway ............... H04N 17/02
348/E17.004
7,023,470 B2 * 4/2006 Braun .................. H04N 17/04
348/117
(Continued)

FOREIGN PATENT DOCUMENTS

EP         1104134 A2     5/2001

OTHER PUBLICATIONS

European Patent Office, Extended European Search Report Issued in Application Serial No. 15909402.8, dated Jul. 10, 2019, Germany, 8 pages.
(Continued)

*Primary Examiner* — Fahmida S Chowdhury
(74) *Attorney, Agent, or Firm* — McCoy Russell LLP (57) ABSTRACT

Embodiments are disclosed for mapping a networked system. In one example, a control device in a system includes a communication interface coupled to a plurality of devices via a network, a processor, and a storage device storing instructions executable by the processor to transmit a command via the network to the plurality of devices connected to the network, and command the devices to send, via an analog communication interface, an analog message from each device output that is connected to an associated input of another device in the system including information about the output device and output port. The instructions are further executable to determine and map each connected device in the system to an associated device input of another device based on the received analog message for that device output, and, for each mapped device, transmit device data to the device including information about analog connections of the device.

17 Claims, 5 Drawing Sheets (56) References Cited

U.S. PATENT DOCUMENTS

| | | | |
|---|---|---|---|
| 2002/0171624 A1* | 11/2002 | Stecyk | H04L 12/282 |
| | | | 345/156 |
| 2008/0188227 A1* | 8/2008 | Guedalia | H04M 3/42093 |
| | | | 455/445 |
| 2010/0087175 A1 | 4/2010 | Roundtree | |
| 2011/0047246 A1* | 2/2011 | Frissora | H04L 67/24 |
| | | | 709/219 |
| 2011/0129197 A1 | 6/2011 | Lin | |
| 2011/0142205 A1 | 6/2011 | Bonnett | |
| 2011/0143747 A1 | 6/2011 | Jia et al. | |
| 2012/0142333 A1 | 6/2012 | Kasturi et al. | |

OTHER PUBLICATIONS

ISA Korean Intellectual Property Office, International Search Report and Written Opinion Issued in Application No. PCT/US2015/062335, dated Aug. 23, 2016, WIPO, 11 pages.

* cited by examiner

AUTOMATED SYSTEM SETUP

CROSS REFERENCE TO RELATED APPLICATIONS

The present application is a U.S. National Phase of International Application No. PCT/US2015/062335, entitled "AUTOMATED SYSTEM SETUP", and filed on Nov. 24, 2015. The entire contents of the above-listed application are hereby incorporated by reference for all purposes.

FIELD

The disclosure relates to signal mapping to automatically set up a system including audio and/or video devices and/or other computing devices connected to one another.

BACKGROUND

Networked systems may include a plurality of devices connected to one another to provide interrelated functionality. For example, a networked system may include an audio/video system, which includes a plurality of audio/video input devices, output devices, control devices, and other devices connected to one another directly or indirectly. Such audio/video systems may range from small-scale home entertainment setups (e.g., with an audio/video receiver, amplifier, speaker(s), and/or display device) to large-scale professional audio/video systems.

AV systems often comprise of both traditional analog connections for transmitting audio and video signals along with advanced digital network communications for communicating parameters for controlling or monitoring analog signals. These systems are often difficult to setup initially and diagnose if there are problems because of the number of connections and cables.

SUMMARY

Embodiments are disclosed for mapping a networked system. The disclosure provides for leveraging analog signals in an audio system to communicate important connection data. When combined with current wired and wireless digital networking, these signals may provide the user with automated setup and advanced diagnostic information on how the systems analog inputs and outputs are connected. In one example, a control device in a networked system includes a communication interface coupled to a plurality of devices of a network, a processor, and a storage device storing instructions executable by the processor to transmit, via the communication interface, a command via a network to the plurality of devices connected to the network, and receive, via the communication interface, an analog message sent from each device output of the plurality of devices that is connected to an associated input of another device in the network. The instructions are further executable to determine and map each device output to an associated device input of another device based on the received analog message for that device output, and, for each mapped device output, transmit device information for the device including that device output to the other device including the associated device input.

In an example method for mapping a wirelessly-networked system, a wireless control device has a digital network connection to one or more other devices which have one or more analog inputs and/or outputs in addition to their digital wireless networking capability. The analog output ports of these hybrid analog/digital devices may be connected to other hybrid device's analog input ports. The method includes the control device transmitting a command to all hybrid devices requesting that they send an analog message from their individual analog output ports. The messages transmitted include, but are not limited to, the hybrid device's identity and the individual port designation. This message is received at the input port of one or more other hybrid devices to which the output of the first hybrid device is connected. The messages are stored and interpreted within the receiving device. The received device information is then transmitted via the wireless network back to the control device allowing the control device to perform a system mapping based on the information received from all hybrid devices. The example method further includes transmitting device information back to the hybrid devices via the wireless control device specifying the connected state of all hybrid devices on the network. For example, the second hybrid device may receive information regarding the first hybrid device, including the specific output port of the first device to which it is connected. Likewise, in the example above, the first hybrid device may be sent information about the second device and the port input to which its output is connected.

An example device in a networked system includes a device input port connecting the device to an associated output device, a device output port connecting the device to an associated input device, a processor, and a storage device storing instructions executable by the processor to receive a command from a control device to enter an analog mapping mode, and transmit a first analog message to the associated input device, the first analog message identifying the device and the device output port. The instructions are further executable to receive a second analog message from the associated output device, the second analog message identifying the associated output device and a device output port of the associated output device, transmit the second analog message to the control device, and receive device information for one or more of the associated output device and the associated input device from the control device based on the first and second analog messages.

BRIEF DESCRIPTION OF THE DRAWINGS

The disclosure may be better understood from reading the following description of non-limiting embodiments, with reference to the attached drawings, wherein below.

DETAILED DESCRIPTION

Networked systems may range from relatively simple to relatively complex arrangements of a plurality of devices. In any system, however, organization of devices in terms of connectivity, functionality, and physical placement may affect the operation of such devices. For example, diagnostics may be completed more efficiently when connectivity and functionality of each device is known, as the diagnostic routine may be tailored for each device or device input/output in the system. As another example, a controlled output (e.g., sound and/or video) to produce an intended effect (e.g., surround or three-dimensional sound, distributed display, etc.) may be achieved once device connections, locations, and functionality are known to a controller.

Devices in a networked system may be connected to other devices via physical connections (e.g., port-to-port connections). Accordingly, a user or manager of the system may be able to physically locate wires connecting such ports in order to determine a way in which the devices are located. However, such a process may become challenging or unfeasible in more complex systems, such as systems that are incorporated in large-scale physical structures, systems that include a large number of devices, systems that include wireless connections, etc. The user may also have to perform a time-consuming process of individually and sequentially entering the connection information for each connection as it is visually inspected. Furthermore, the user or manager of the system may not be able to identify other features of the devices, such as model, version, functionality, etc., based on visual inspection alone. The disclosure provides methods and systems for automatically mapping analog signal routing in a networked system. By utilizing a wired and/or wireless data network together with encoded analog communication, devices with varying capabilities may be used to automatically identify themselves and their connectivity within the system.

Figure 1A:
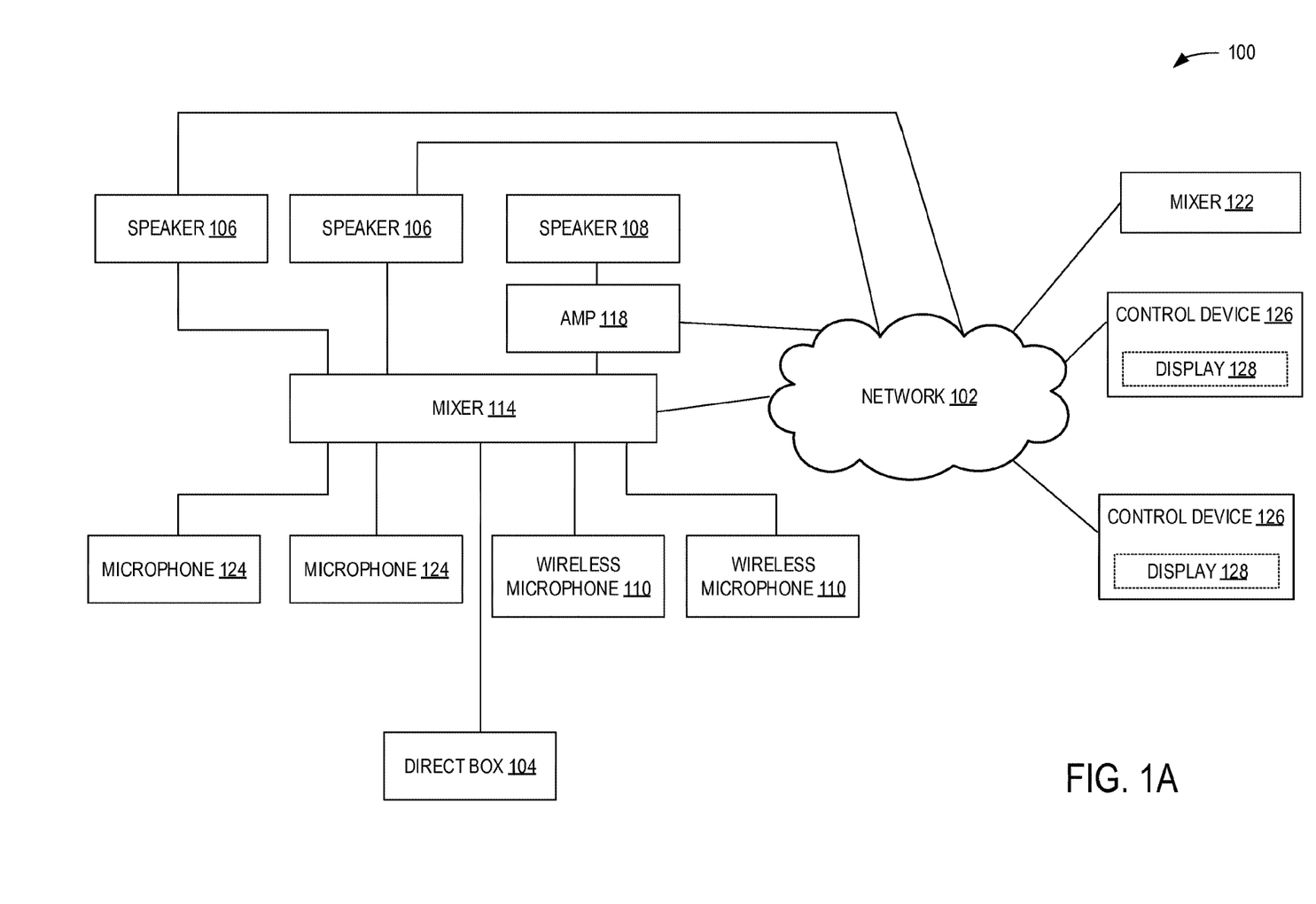
FIG. 1A shows an example networked system in accordance with one or more embodiments of the present disclosure.

FIG. 1A shows an example networked system 100 including a plurality of connected devices. In the illustrated figure, the devices include audio-related computing devices, however it is to be understood that any suitable devices may be included in the system and perform the methods described in the disclosure. It is also to be understood that direct and indirect connections illustrated in FIG. 1A are exemplary in nature, and the devices may be connected in any suitable manner. For example, devices that are illustrated as being connected via network 102 may be directly connected and/or connected via one or more intermediate devices in some examples, and devices that are illustrated as being connected directly and/or connected via one or more intermediate devices may be connected via network 102 in some examples. Illustrated and/or described connections may correspond to wired (e.g., physical connections, such as Ethernet, co-axial, RCA, component, S-video, VGA, DVI, HDMI, FireWire, DisplayPort, USB, Thunderbolt, UDI, MHL, RS232, RS485, SCART, optical fiber, and/or other suitable cabling) and/or wireless (e.g., WI-FI, WI-FI Direct, Bluetooth, WIMAX, cellular, and/or other types of wireless communication) connections. Network 102 may include any suitable network, such as a hybrid digital data and analog audio/video network.

Networked system 100 includes a mixer 114 that receives audio signals from one or more sources, such as one or more passive microphones 124, one or more wireless microphones 110, a direct box 104 (e.g., which may be an intermediary unit between a sound-producing device, such as a guitar or other instrument, and the mixer), and/or any other suitable sound sources. In some examples, audio signals may be provided via a computing system that stores and/or accesses audio content (e.g., media items) for playback or presentation. The mixer may output received audio signals via one or more output devices, such as speakers 106 and 108. As illustrated, the mixer may provide audio signals to the output devices directly (e.g., as illustrated with respect to speakers 106) and/or via one or more intermediate devices, such as amplifier 118. The mixer 114 and/or amplifier 118 may receive audio signals and process the signals for output by associated output devices. For example, the mixer 114 may encode and/or decode the content for playback at an associated (e.g., connected) output device, adjust equalization or other presentable features of the content, selectively delay output of the content to the output devices in order to synchronize or otherwise control playback, separate channels of data or otherwise control routing of selected data to selected devices (e.g., based on addressing, capabilities, bandwidth, and/or other considerations), and/or perform any other suitable processing on the signals received from passive microphones 124, wireless microphones 110, direct box 104, and/or any other sound source.

The mixer 114 may be addressable and/or otherwise manage audio content to be played back via selected devices. For example, mixer 114 may only process audio content to be output via speakers 106 and 108, and may ignore or transmit any other content to another device. In some examples, the audio content may be addressable, such that mixer 114 only receives content to be played back at speakers 106 and 108. In still other examples, the audio content may be categorized such that only content matching capabilities of output devices connected to mixer 114 is transmitted to and/or processed/transmitted by mixer 114 for output at speakers 106 and 108. For example mixer 114 may only receive and/or process/transmit audio content of a specific type (e.g., audio of a specific channel or frequency, such as audio for rear speakers in a surround system or audio for playback at a subwoofer).

In some examples, the processed audio signals from mixer 114 may be used to drive the associated/connected speakers. In the illustrated example, amplifiers may be used as a further intermediary device between a) the audio sources 124, 110, and 104 and/or the mixer 114 and b) the speakers 106 and 108. Amplifier 118 may receive audio data directly from an audio source and/or may receive processed audio data from mixer 114. Audio received at amplifier 118 may be adjusted (e.g., an amplitude of audio signals may be adjusted) and transmitted for playback at speaker 108 (as illustrated). Amplifier 118 may include configurable settings, such as gain and equalizer settings, to process the audio signals. The processed audio signals may be used to drive the associated/connected speakers to control presentation of the audio content according to the configurable settings.

Mixer 122 may also process signals from the audio sources. Processing by the mixer 122 may be based on configurable settings such as filters, compressors, equalizers, effects, gains, and/or any other settings that are included in the mixer. Following processing by the mixer 122, processed audio signals may be received by the mixer 114 and/or amplifier 118 for further processing and/or sent directly to the output devices (e.g., speakers 106 and/or 108). Mixers 114 and 122, and/or amplifier 118 may additionally or alternatively receive audio signals from microphones 124, microphones 110, and/or direct box 104 for processing. The processed and/or raw audio signals from microphones 124, microphones 110, and/or direct box 104 may be sent to drive speakers 106 and/or 108 and/or may be sent to a computing device for further processing.

One or more control devices 126 may be connected to the system 100 via network 102. For example, a computing device, such as a portable computing device (e.g., a tablet, smartphone, laptop, etc.) and/or other suitable computing device (e.g., a desktop computer, server, etc.) may be connected to one or more of the devices in system 100 via a wired or wireless connection. Control device 126 may serve as a transmitter and a receiver by transmitting control instructions to devices in the system and receiving identifying information from the devices. Data received at the control device 126 may be processed in order to map output-to-input connections within the system. More details regarding the control and mapping provided by the control device 126 is discussed below with respect to FIG. 3. Control device 126 may include and/or be coupled to a display device 128 for presenting a graphical user interface (GUI) to a user of the control device. For example, a result of the mapping and/or user interface controls allowing the user to adjust the processing performed by one or more of the devices in the system may be provided on the GUI. In this way, a user may configure a desired audio/video output profile, and the control device 126 may transmit control instructions to the devices in the system based on the detected mapping of the devices in order to present audio/video content according to the requested audio/video output profile.

Figure 1B:
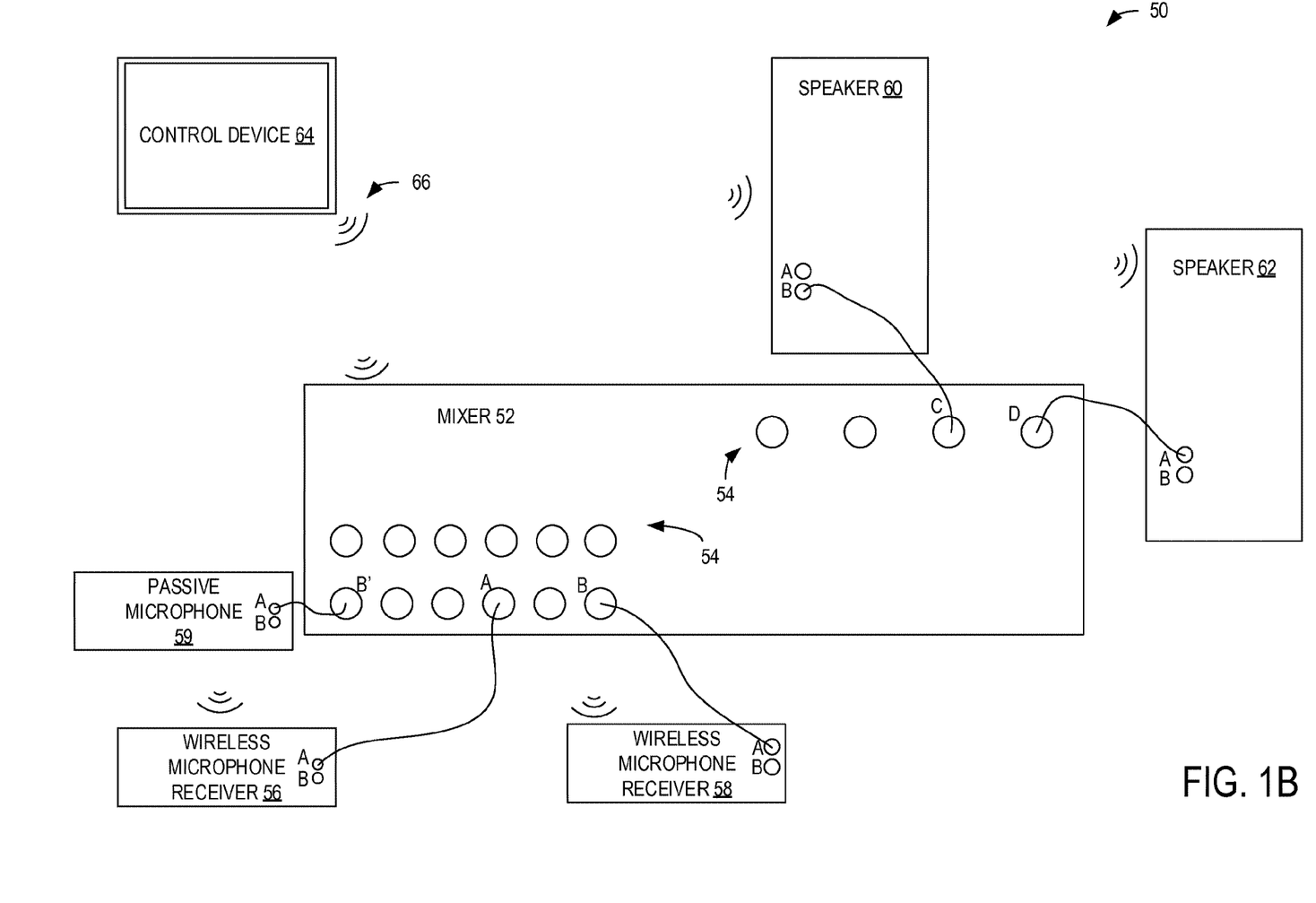
FIG. 1B is a block diagram of example input/output connections in an example audio/video networked system in accordance with one or more embodiments of the present disclosure.

FIG. 1B shows a block diagram of example input/output connections in an example audio/video networked system 50. As shown, a mixer 52 may be connected to devices in the network via the analog audio system various analog ports ports 54. For example, wireless microphone receiver 56 is connected to port A, wireless microphone receiver 58 is connected to port B, passive microphone 59 (e.g., a microphone without wireless communication capabilities) is connected to port B', speaker 60 is connected to port C, and speaker 62 is connected to port D. Likewise, each device connected to mixer 52 may have one or more ports that may be connected to other devices. For example, port A of wireless microphone receiver 56 is connected to port A of mixer 52, port A of wireless microphone receiver 58 is connected to port B of mixer 52, port A of passive microphone 59 is connected to port B' of mixer 52, port B of speaker 60 is connected to port C of mixer 52, and port A of speaker 62 is connected to port D of mixer 52. In the illustrated example, the mixer is connected to the devices 56-62 via respective wired connections. However, it is to be understood that in other examples, one or more connections between the above-described devices may be wireless.

Control device 64 may include a computing device, such as a tablet, executing a network device mapping application. Control device 64 may be connected to mixer 52 and devices 56, 58, 60, and 62 via a wireless connection, as illustrated by wireless transmission icon 66. The control device may discover each of the devices in the networked system 50 by sending out a beacon or broadcast and listening for replies from the devices, by consulting a map or table of known devices in the networked system, and/or by any other suitable discovery method. After discovering the devices, the control device 64 may send out a command (e.g., via the wireless connection) to each device and/or to a subset of the devices (e.g., each intermediate device) identified during the discovery process. In other examples, the control device 64 may not perform a separate, dedicated discovery process, and may send out the command as a broadcast to all connected devices. As described with reference to FIG. 3, the command may instruct the devices to enter an analog mapping mode, in which some or all operations of the devices is to be ceased in order to clear the communication channels between the devices and reduce the opportunity for conflicting processes to be performed. In the example of the passive microphone 59, which is not wirelessly connected to the control device 64, the mixer 52 may send a signal through the cable connecting port A of passive microphone 59 to port B' of mixer 52.

In response to entering the analog mapping mode (e.g., immediately responsive to receiving the command, after a predefined delay, after receiving the command, after receiving a further command from the control device requesting identification information, etc.), each device output may send a unique string of analog audio identifier tones (e.g., DTMF tones) along its connecting medium. For example, mixer 52 may transmit a string of tones along the analog cabling coupling port C of the mixer to port B of speaker 60. As port A of wireless microphone receiver 56 may serve as an output port to port A of mixer 52, mixer 52 may receive a string of tones (e.g., a different string than those sent to speaker 60) along the analog cable connecting port A of the mixer to port A of the wireless microphone receiver 56. In this way, mixer 52 may be both an input and an output device, and may both send and receive identifier tones. The string of identifier tones sent via an output port of a device may be unique in that the string identifies the port from which it is being sent. In other words, even though mixer 52 sends two strings of identifier tones (e.g., via ports C and D to speakers 60 and 62, respectively), each string sent by mixer 52 is unique/different. The strings sent from the same or similar devices may have overlapping information, as information identifying the device itself may be transmitted therein. However, different data representing the different ports from which each string is sent causes the string as a whole to be unique. In the case of the passive microphone 59, the signal sent from mixer 52 to passive microphone 59 may energize a circuit in the passive microphone (e.g., via phantom power from mixer 52), and the circuit may be configured to send a command string (e.g., a string of DTMF tones, which may be stored in a storage device of the microphone and/or configured to be output based on a configuration of hardware in the microphone, identifying the passive microphone and/or one or more parameters of the passive microphone) automatically responsive to being energized. In this way, the passive microphone may be capable of participating in the discovery and mapping routine without being wirelessly connected to other devices (e.g., the control device).

Each input port that receives analog identifier tones from a respective output port of a device may transmit the received identifier tone values to control device 64 (e.g., via a wireless connection and/or via the same connection from which the device received the command to enter the analog mapping mode). Based on the received identifier tone values, the control device 64 may decode the tone values to determine connection and operation information for the devices in the networked system. For example, the control device 64 may determine device channel labels, channel preset recall data, device identifiers, device versions/firmware versions, configuration settings for devices/device input/outputs, and/or any other identifying and/or status information. The control device 64 may transmit all or a subset of the determined information to the relevant devices. For example, the code received at input port A of mixer 52 may identify the wireless microphone receiver 56 as the transmitter of data and port A as the output port from which the data was transmitted. When the mixer 52 transmits this code to the control device 64, information identifying the mixer 52 and the input port (e.g., port A) on which the data was received. Accordingly, the control device 64 may send a label to the wireless microphone receiver 56 identifying the mixer 52 and port A of mixer 52 as an input for output port A of wireless microphone receiver 56. In other words, a label of port A of wireless microphone receiver 56 may indicate information corresponding to "mixer 52, input, port A" (e.g., [identification of device to which that port is connected], [indication of whether the device to which that port is connected is an input or an output], [identification of port to which that port is connected]). Configuration information, such as channel preset recall data identifying presets, for a particular first device to which a second device is connected, may be sent to the second device. For example, a preset for audio to be provided to speaker 60 (e.g., a preset associated with the location and/or type of speaker 60) may be transmitted to mixer 52 and associated with port C, which is connected to speaker 60. In another example, wireless microphone receiver 56 may be associated with a particular user profile. An indication of the profile presets may be transmitted to the mixer 52 and stored at the mixer to control operation of the wireless microphone receiver 56 according to the user profile. Likewise, speaker 60 and/or wireless microphone receiver 56 may receive the respective preset information associated therewith and/or associated with mixer 52.

Figure 2:
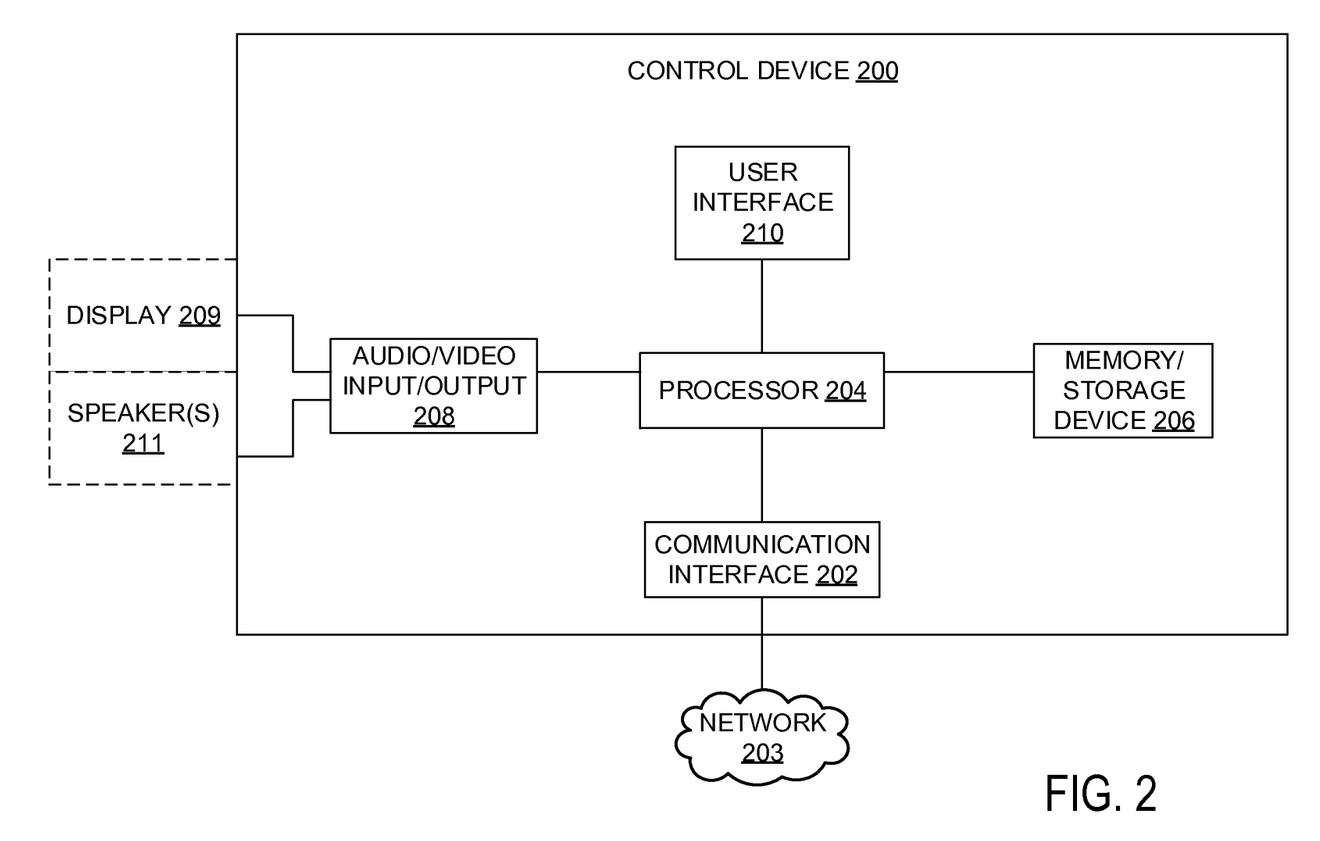
FIG. 2 shows a block diagram of a control device for a networked system in accordance with one or more embodiments of the present disclosure.

FIG. 2 shows a block diagram of a control device 200 for a networked system. For example, control device 200 may be an example of control device 126 of FIG. 1A and/or control device 64 of FIG. 1B. Control device 200 includes a communication interface 202, which may be any configuration of hardware and/or software that enables communication over a network 203. Where control device 200 corresponds to an example of control device 126 of FIG. 1A, network 203 may correspond to network 102 of FIG. 1A. For example, communication interface 202 may enable communication over a wired and/or wireless communication network. In some examples, communication interface 202 includes two or more types of antennas for wireless communication and/or connectors for wired communication.

Control device 200 includes a processor 204 (e.g., a hardware processor) including one or more modules for processing data and/or executing actions. The processor 204 may include any device that is configured to execute instructions to manage devices/modules within and/or connected to control device 200. For example, processor 204 may execute instructions stored in memory 206. Memory 206 may include any suitable storage device, including non-transitory storage devices such as a hard disk drive, an optical drive and/or associated optical media, a Random Access Memory (RAM), a Read-Only Memory (ROM), a Programmable Read-Only Memory (PROM), an Electrically Erasable Programmable Read-Only Memory (EEPROM), a flash memory, or any other data storage device. Although shown as a local storage device, it is to be understood that memory 206 may include one or more remote storage devices that are remote from control device 200 and that may store instructions executable by processor 204 and/or data that may be processed by processor 204.

Audio/video input/output device 208 may include ports and/or processing modules for inputs and/or outputs coupled directly to control device 200. For example, audio/video input/output device 208 may couple control device to an external display device 209 and/or one or more external speakers 211. In some examples, one or more of display device 209 and speakers 211 may be integrated with and included in control device 200. In such examples, audio/video input/output 208 may include internal interconnects for transmitting data to the display/speakers.

User interface 210 may include a hardware and/or software module for controlling presentation of a graphical user interface and/or processing of inputs received via the graphical user interface and/or any other suitable user input device. For example, a graphical user interface (e.g., displaying a mapping of a networked system being controlled by control device 200) may be presented via display 209 based on instructions generated by user interface 210. A user input device may include buttons, sliders, knobs, a touch screen, and/or any other actuator or type of interface that allows user commands to be provided to the control device 200. The user interface 210 may receive and process user input from devices integrated into the control device 200 and/or remote from/coupled to control device 200 to control operation of the control device 200 and/or devices controlled by control device 200.

Figure 3:
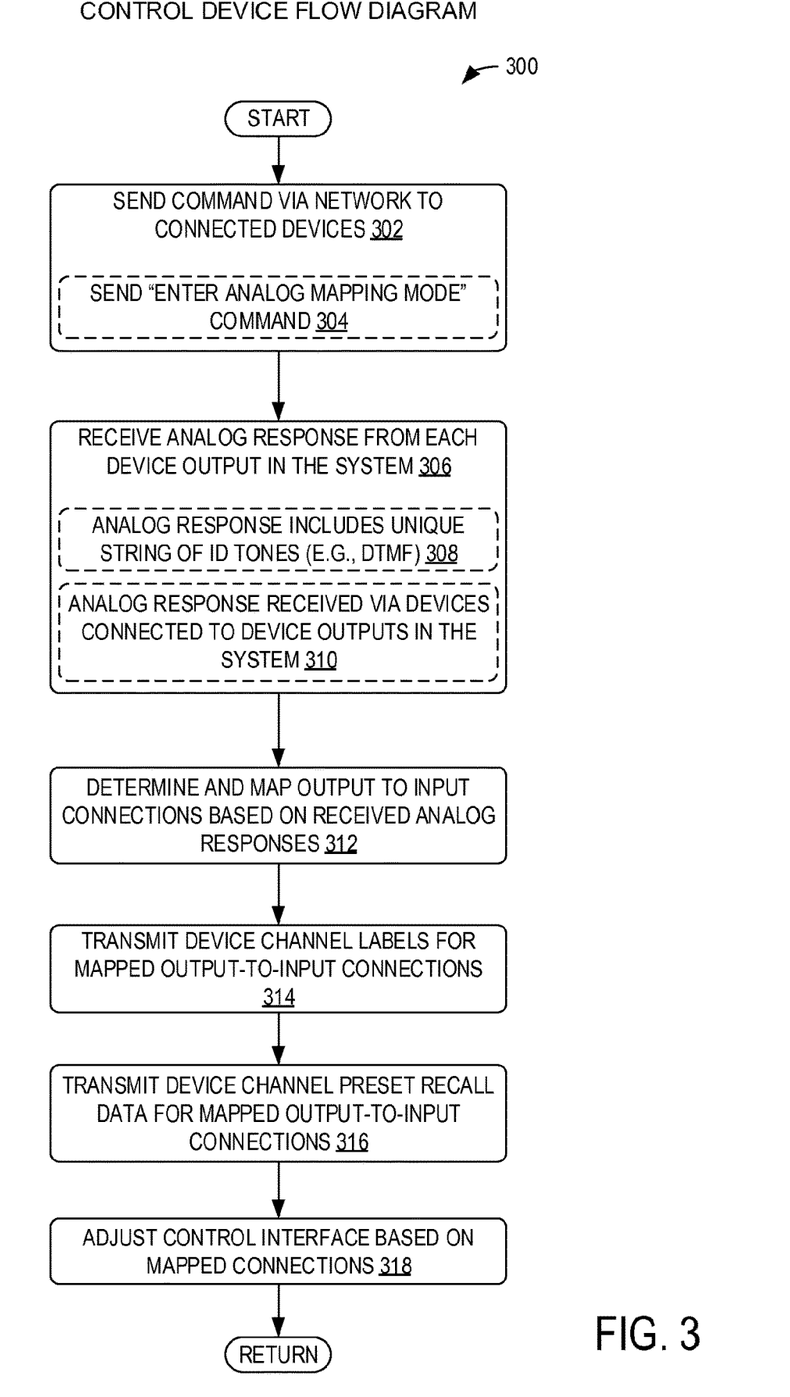
FIG. 3 is a flow chart of a method for determining and mapping devices in a networked system in accordance with one or more embodiments of the present disclosure.

FIG. 3 is a flow chart of a method 300 for determining and mapping devices in a networked system. Method 300 may be performed by any suitable computing device, including but not limited to control device 126 of FIG. 1A and/or control device 200 of FIG. 2. At 302, the method includes sending a command via a network to connected devices (e.g., devices connected to the network and/or connected to the control device, e.g., via the network). As indicated at 304, the command may include sending an "Enter analog mapping mode" command, which may instruct the connected devices to transition into a mode that accommodates the analog mapping described below. More details regarding the analog mapping mode are described below with respect to FIG. 4.

At 306, the method includes receiving a response with the results of the analog messaging from each device output in the system (e.g., from each port of each device that received the command transmitted at 302 that is configured to output data to another device). As indicated at 308, the analog message may include a unique string of identifier tones (e.g., DTMF tones). As further indicated at 310, the analog message may be received via devices that are connected to device outputs in the system. For example, with regards to the networked system 100 of FIG. 1A, the analog message may be transmitted from output ports of intermediate devices, such as audio/video processors 114, amplifiers 118, and mixer 122 to associated output devices configured to receive data from the intermediate devices. The output devices may then transmit the received analog message (e.g., with an indication of a port on which the analog message was received) to the control device. In other examples, output devices, such as speakers 106, 108, may include circuitry to enable an analog message to be sent to associated devices, such as audio/video processors 114, amplifiers 118, and mixer 122. Each of the devices may send the received analog message, and an indication of a port on which the analog message was received, to the control device.

At 312, the method includes determining and mapping the output-to-input connections based on the received results of the analog messaging. For example, the control device may decode the received tones to determine information such as a device address, a device output (e.g., a numerical or alphanumerical port identifier) from which the tone is being emitted, a device manufacturer, a device version (e.g., a firmware version), a type of device, device output specifications, device network connection details, and/or any other suitable information regarding the device from which the tone was emitted. In other examples, the receiver of the analog message (e.g., the receiving device including the device input that received the analog message and/or an intermediate device configured to pass the analog message from the receiving device to the control device) may decode or partially decode the received tones to determine the identifying information and pass the decoded or partially decoded information to the control device. At 314, the method includes transmitting device channel labels for mapped output-to-input connections. For example, each output port that sent the analog message may be mapped to one or more input ports that received the analog message from that output port. At 316, the method includes transmitting device channel preset recall data for mapped output-to-input connections. For example, the control device may store preset information including configuration settings for individual devices, types of devices, users, etc. The preset information for a given device may be passed to all devices connected thereto. At 318, the method includes adjusting the user interface of the control device based on the mapped connections. For example, the user interface may be adjusted to display the mapped connections and/or any changes since the last time the system was mapped. In additional or alternative examples, the user interface may be adjusted to display selections for controlling the system based on the mapped connections and/or the capabilities of the discovered devices.

Figure 4:
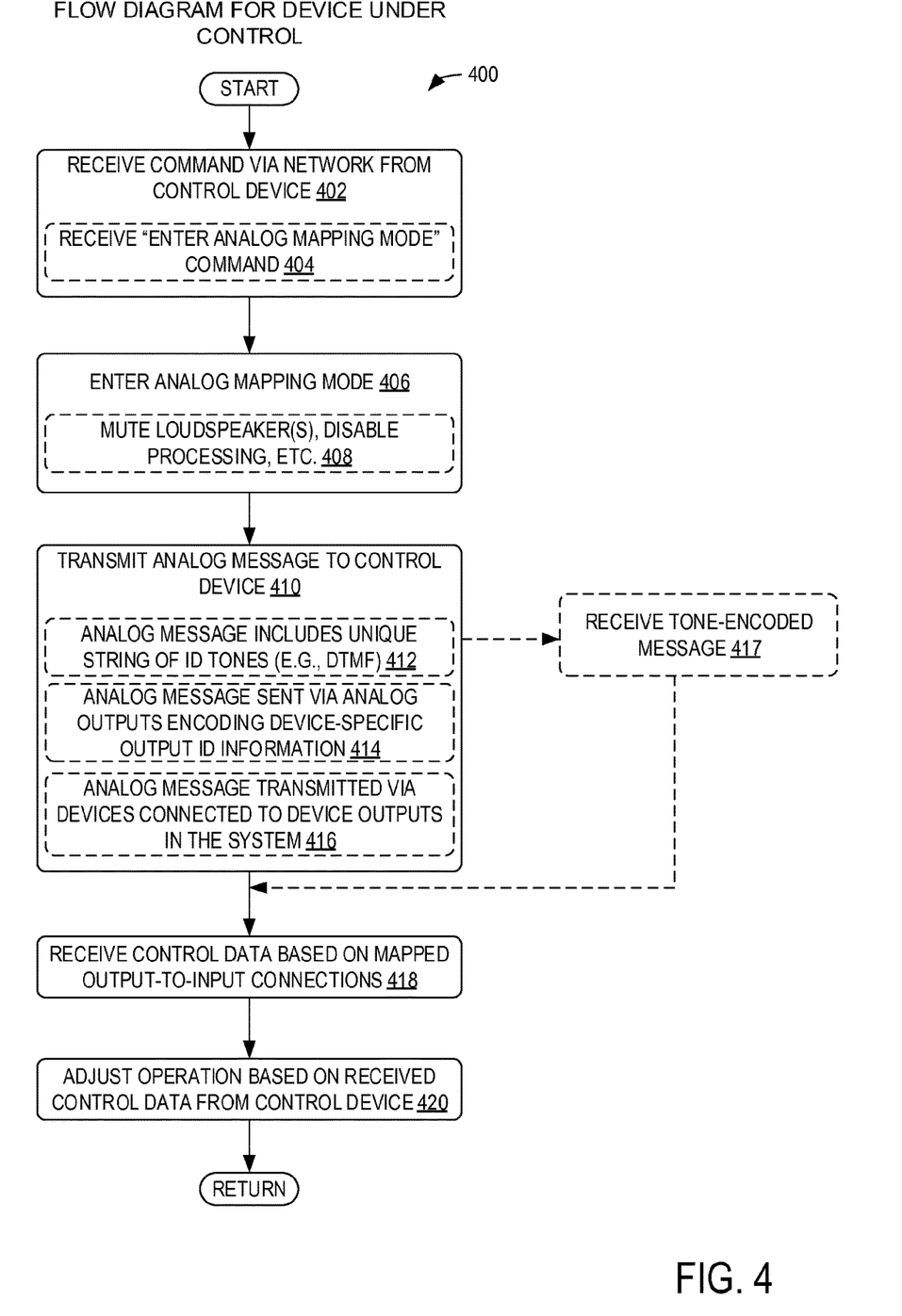
FIG. 4 is a flow chart of a method for performing analog mapping at a device under control of a networked system in accordance with one or more embodiments of the present disclosure.

FIG. 4 is a flow chart of a method 400 for performing analog mapping at a device of a networked system. For example, method 400 may be performed by any of the output devices (e.g., speakers 106, 108) and/or processing/intermediate devices (e.g., audio/video processors 114, amplifiers 118, and mixer 122). At 402, the method includes receiving a command via the network and/or one or more intermediate devices in the networked system from a control device. As indicated at 404, the command may include an "Enter Analog Mapping Mode" command.

At 406, the method includes entering the analog mapping mode. As indicated at 408, entering the analog mapping mode may include muting any loudspeakers (or instructing connected loudspeakers to be muted and/or ceasing output of audio content to the connected loudspeakers), disabling processing of audio/video content, and/or performing other changes to operation to focus the device on the analog mapping task. In response to receiving a message via a network communications interface (e.g., the command), the device may prepare for an analog message to be transmitted via its analog outputs to other device inputs. At 410, the method includes transmitting an analog message to the input port of another device. As indicated at 412, the analog message may include a unique string of identifier tones (e.g., DTMF tones). For example, each device port may be pre-programmed to emit a set of encoded tones identifying the device and/or the port responsive to a command from a control device (e.g., responsive to entering the analog mapping mode), as indicated at 414. As indicated at 416, the analog message may be transmitted via input devices connected to device outputs in the system. For example, each device in the system may include input and/or output ports, such that input ports are configured to receive analog signals and output ports are configured to transmit analog signals. Input ports may be coupled to an input interface (e.g., an analog input interface) and processor and/or memory to process and/or store the received data for use by the device. The processor and/or memory may be configured to store and/or decode an encoded message (e.g., an analog message) received from another device via the input ports and prepare (e.g., encode) the message for transmission to another device and/or a control device. Output ports may be coupled to an output interface (e.g., an analog output interface) and processor and/or memory to process/store data to be sent from the device. The method, as performed by an output device, may include receiving an analog message at a port that is configured to receive data from another device output, and directly transmitting the received analog message to the control device and/or sending the analog message to an intermediate device (e.g., audio/video processors 114, amplifiers 118, and/or mixer 122) to be passed along to the control device. The transmitted analog message may be unchanged from the received analog message (e.g., without decoding and/or encoding the analog message or otherwise altering the received analog message) and/or generated based on decoding, storing, and encoding the received analog message. The method, as performed by an intermediate device, may include transmitting an analog message to each device connected to an output port of the intermediate device and receiving an analog message from each device connected to an input port of the intermediate device, as indicated at 417. The intermediate device may then directly transmit the received analog message(s), and/or any analog messages received from output devices to be passed along to the control device (e.g., either unchanged or adjusted based on information at the intermediate device). In some examples, the intermediate device may transmit one or a subset of received analog messages to another intermediate device.

At 418, the method includes receiving control data based on mapped output-to-input connections. At 420, the method includes adjusting operation based on the received control data from the control device. For example, an audio/video processor may be controlled to adjust equalization of audio output by a connected speaker responsive to received control data from the control device. The received control device may instruct the device(s) in the networked system to exit the analog mapping mode and/or otherwise resume normal operation in some examples.

By transmitting identifier tones (e.g., in one direction, from output to input) throughout a system of devices and decoding such tones, connection information may be discovered simultaneously for all devices in the system. By using analog tones that actually travel the connections between the devices, said connections may be automatically mapped precisely by a control device that receives and decodes the tones. Further, each device may only be aware of its own identifying information (e.g., device identifier and port identifier) upon sending or receiving the information encoded in the tones. However, after the control device receives and decodes the tone information that have completed the journey across the physical connections, these connections may be automatically mapped, presets may be automatically recalled, and channels may be automatically labelled in order to ensure that each device receives and/or stores relevant information for handling incoming and/or outgoing data according to a set configuration (e.g., a user-specified configuration).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the control device 126 and/or 200 described with reference to FIGS. 1A and 2 and/or any of the devices in networked systems 100 or 50 of FIGS. 1A and 1B, respectively. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A control device in a networked system, the control device comprising:
a network communication interface coupled to a plurality of devices of a network;
a processor; and a storage device storing instructions executable by the processor to:
transmit, via the network communication interface, a command via the network to the plurality of devices connected to the network;
receive a message via the network communication interface and prepare the networked system for analog messages to be transmitted via analog outputs to other device inputs;
transmit, via an analog communications interface, an analog message sent from each device output of the plurality of devices that is connected to an associated analog input of another device in the networked system, wherein the analog message includes a unique string of ID tones encoded to identify the device;
receive, via the network communication interface, an encoded message from a controlled device, the encoded message being generated from a stored and decoded analog message, the analog message being received at the controlled device from each output device connected to an input device;
determine and map each connected device analog output to an associated device analog input of another device based on the received analog message for that connected device analog output; and
for each connected and mapped device analog output, transmit device information for the device including information detailing device output specifications to the other device including the associated device analog input.

2. The control device of claim 1, wherein the device information includes one or more of a preset associated with the device including the connected and mapped device analog output and a label for a channel of the device including the connected and mapped device analog output.

3. The control device of claim 1, wherein the unique string of tones identifies one or more of a device address, a device output from which the unique string of tones is being emitted, a device manufacturer, and a device version.

4. The control device of claim 1, wherein the plurality of devices includes one or more audio/video devices, and wherein the network is a hybrid digital data and analog audio/video network.

5. The control device of claim 1, wherein the instructions are further executable to generate a user interface for controlling operation of one or more of the plurality of devices in the network and adjust the user interface based on mapped connections between the plurality of devices.

6. The control device of claim 1, wherein the instructions are executable to transmit the command to the plurality of devices and receive the encoded message via a wired or wireless network.

7. The control device of claim 1, wherein the instructions are further executable to decode the encoded message to determine connections between each connected device analog output and associated device analog input.

8. The control device of claim 1, wherein the command comprises an instruction to enter an analog mapping mode, the analog mapping mode including ceasing operation of one or more processes of the plurality of devices receiving the command.

9. A method, comprising:
transmitting a command via a network from a control device to one or more other devices connected to the network, the one or more other devices including one or more connected devices connected to one another via analog signal inputs and outputs, each output of the one or more connected devices outputs being connected to an associated device input;
receiving, at the control device, an analog message sent from each output of the one or more connected devices, wherein receiving the analog message includes receiving a unique string of ID tones encoded to identify the device;
determining and mapping each output of the one or more connected devices output to the associated device input based on the received analog message for that connected device output; and
for each connected device output, transmitting device information for a device associated with that connected device output to a device associated with the associated device input for that connected device output.

10. The method of claim 9, wherein the unique string of ID tones identifies one or more of a device address, a device output from which the unique string of tones is being emitted, a device manufacturer, a device version, and device network connection details.

11. The method of claim 9, wherein the device information includes one or more of a preset associated with the device including mapped device output and a label for a channel of the device including the mapped device output.

12. The method of claim 9, further comprising generating a user interface for controlling operation of one or more of the devices in the network and adjusting the user interface based on mapped connections between each of the connected device outputs and associated device inputs.

13. A device of a networked system, the device comprising:
a device analog input port connecting the device to an associated analog output device;
a device analog output port connecting the device to an associated analog input device;
a processor; and a storage device storing instructions executable by the processor to:
  receive a command from a control device to enter an analog mapping mode;
  transmit a first analog message to the associated analog input device, the first analog message identifying the device and the device analog output port;
  receive a second analog message from the associated analog output device, the second analog message identifying the associated analog output device and a device analog output port of the associated analog output device, wherein the first and second analog messages comprise a unique string of tones encoding information identifying the device and the device analog output port;
  transmit the second analog message to the control device; and
  receive device information for one or more of the associated analog output device and the associated analog input device from the control device based on the first and second analog messages.

14. The device of claim 13, wherein the device information includes one or more of a preset associated with one or more of the associated analog input device and the associated analog output device, a label for a channel of the associated analog input device, and network details including addresses or wireless connection information.

15. The device of claim 14, wherein the instructions are further executable to adjust operation according to the preset associated with the one or more of the associated analog input device and the associated analog output device.

16. The device of claim 13, further comprising entering the analog mapping mode responsive to receiving the command from the control device and adjusting operation to cease one or more processing tasks responsive to entering the analog mapping mode.

17. The device of claim 13, wherein the instructions are executable to transmit the second analog message to the control device as an encoded message generated at the device based on the second analog message as received at the device analog input port.

* * * * *